United States Patent [19]
Murao et al.

[11] 3,861,782
[45] Jan. 21, 1975

[54] ELECTRO-OPTICAL DEVICE UTILIZING A NEMATIC LIQUID CRYSTAL OF SCHIFF BASE TYPE

[75] Inventors: Kenji Murao; Kazuhisa Toriyama; Fumio Nakano; Mikio Sato; Tadashi Muroi, all of Hitachi, Japan

[73] Assignee: Hitachi, Ltd., Tokyo, Japan

[22] Filed: Dec. 13, 1973

[21] Appl. No.: 426,706

[30] Foreign Application Priority Data
Dec. 18, 1972  Japan............................. 47-126115

[52] U.S. Cl.............................. 350/160 LC, 252/299
[51] Int. Cl.............................................. G02f 1/16
[58] Field of Search ............... 350/160 LC; 252/299

[56] References Cited
UNITED STATES PATENTS
3,656,834   4/1972   Haller et al............... 350/160 LC X
3,809,456   5/1974   Goldmacher et al......... 350/160 LC
3,814,700   6/1974   Averiam et al........... 350/160 LC X

*Primary Examiner*—Edward S. Bauer
*Attorney, Agent, or Firm*—Craig & Antonelli

[57] ABSTRACT

An electro-optical device comprises a layer of a Schiff base type liquid crystal, means for supporting the liquid crystal layer and means for applying an electric field to the liquid crystal layer, where the liquid crystal contains a small amount of an alkyl iodide compound. This liquid crystal composition has improved dynamic scattering mode properties, so that the device can be operated by simple driving means such as multiplexing.

4 Claims, 6 Drawing Figures

ELECTRO-OPTICAL DEVICE UTILIZING A NEMATIC LIQUID CRYSTAL OF SCHIFF BASE TYPE

BACKGROUND OF THE INVENTION

This invention relates to an electro-optical display device containing a nematic liquid crystal composition for displaying numerical figures, letters, graphs, images, etc.

Several display devices based on the use of nematic liquid crystals have been already proposed. One of the devices utilizes a dynamic scattering mode of the nematic liquid crystal. When an electric field is applied to a film of nematic liquid crystals, there takes place a turbulent flow due to flow of ions in the liquid crystal, and the orientation of the liquid crystals is disturbed. Light beams incident onto the film layer are scattered and show a white turbidity. The intensity of transmission or reflection of the incident light beams depends upon the applied electric field, and thus a kind of an electro-optical effect is recognized in this system. That is, the display device utilizes this electro-optical effect, so that a desired pattern can be displayed by changeover of voltage or frequency which is applied to the liquid crystal according to input signals. The display device of such kind has a very small power consumption and can be actuated under a relatively low voltage. Therefore, such display device is useful for digital clocks, small table-type electronic computers, electrical measuring instruments, etc. Further, it is also adapted for a large scale display device, because the display panel can be made into a plane.

When a large number of points on the same display surface or desired points of segments are displayed in such a display device, the simplest device is a device capable of driving a matrix type display by multiplexing. However, the characteristics necessary for a liquid crystal material, which can be utilized to drive a device having more than a few display points by a relatively simple circuit by multiplexing, are that (1) the curve of the applied voltage versus the scattered light intensity has a sharp threshhold, (2) the scattering responds quickly when the excitation voltage is applied; (3) the scattering can respond also to the application of voltage having a sufficiently short pulse width, etc. In addition, it is necessary for the low voltage driving that the liquid crystal material has a low threshold voltage for light scattering. However, the conventional liquid crystal materials hardly satisfy these necessary characteristics. To obtain these necessary characteristics, it is necessary to suit the liquid crystal material to the driving circuit, and also it is necessary to control the electric resistance of the liquid crystal material to some degree while maintaining said necessary characteristics. However, the electric resistance of the conventional liquid crystal material is as high as or higher than 5 × $10^9 \Omega \cdot cm$, and its control is very difficult.

SUMMARY OF THE INVENTION

An object of the present invention is to provide an electro-optical device utilizing a nematic liquid crystal of Schiff base type, which can overcome the disadvantages of the conventional electro-optical device of this kind; the electro-optical device responds to a train of pulse voltage of such a short width without exhibiting any flickering to observer's eyes, and a curve of the applied voltage versus the scattered light intensity has a sharp, but low threshold voltage.

Another object of the present invention is to lower an electric resistance of the liquid crystal composition while maintaining these necessary characteristics. The scattering characteristics of the liquid crystal are improved with the decrease in the electric resistance.

According to the present invention, the liquid crystal composition having the necessary characteristics and satisfying the objects of the present invention can be obtained by adding to a Schiff base type nematic liquid crystal an alkyl iodide compound, for example, methyl iodide, ethyl iodide, propyl iodide, butyl iodide, etc. No remarkable effect cannot be obtained with the alkyl iodides having an alkyl group of a large number of carbons, and according to the experiment conducted by the present inventors, it has been found that alkyl iodides having an alkyl groups of not more than 4 carbons are suitable for the present liquid crystal composition.

The above objects and other objects as well as features of the present invention will be apparent from the following detailed description taken in conjunction with the drawings.

DETAILED DESCRIPTION OF THE PREFERRED EMBODIMENT

Figure 1:
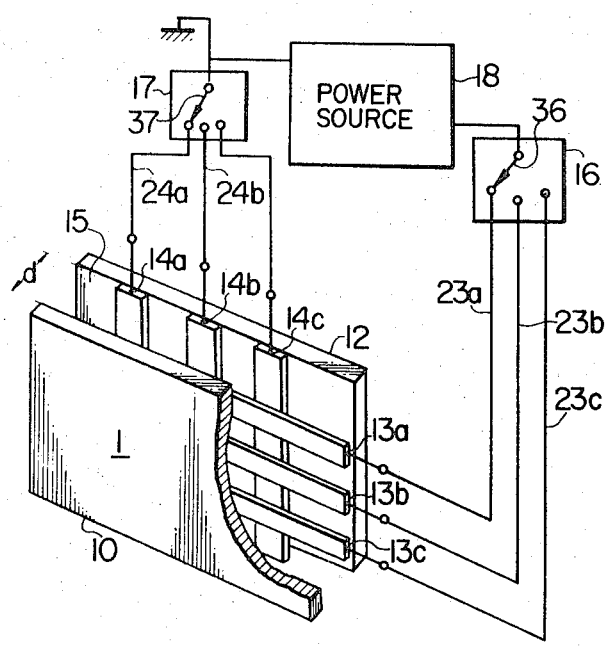
FIG. 1 is a partially cross-sectional perspective view of an electro-optical display device to which the present invention is applied.

The well known, crossed lattice optical display device is shown in FIG. 1 as one example of the electro-optical device, to which the present invention will be applied. However, the scope of the present invention is never restricted to such a device as illustrated in FIG. 1, but it should be understood that one embodiment is shown in FIG. 1 to facilitate the understanding of the present invention. Particularly since the present invention is applicable to a display device made up with a combination of a large number of segments, as will be described later, it should be understood that the following description will not limit the scope of the present invention.

In FIG. 1, a crossed lattice optical display device 1 has a transparent glass back support plate 12 and a transparent glass front support plate 10. These two support plates are placed at a distance d of usually about 5 to 30 microns from each other, and appropriate liquid crystals (not shown in the drawing) are inserted into a phase 15 between these support plates. A plurality of transparent electrodes 13a, 13b and 13c are arranged in parallel on the front support plate 10, and a plurality of transparent electrodes 14a, 14b and 14c are arranged in parallel on the back support plate 12. The electrodes 13a, 13b and 13c of the device 10 are connected to a switch 16 through connecting means 23a, 23b and 23c, respectively, and the electrodes 14a, 14b and 14c to the switch 17 through connecting means 24a, 24b and 24c, respectively. The switches 16 and 17 are connected to an earthed power source 18 through contact means 36 and 37, respectively. In the power source a pulse generator and control means are included, whereby driving voltage is applied to the desired segments through the selected electrodes in accordance with the predetermined order so as to effect the multiplexing driving.

In the transmission-type display device an observer is positioned at a side opposite to the light incident side. The liquid crystals at intersections of the electrodes are disturbed when a sufficiently high voltage is applied between the electrodes, and scatter the incident light. As a result, the disturbed region appears milky white.

In the reflection-type display device, the observer is positioned at the same side as the light incident side, and observes the reflected light which is scattered by the disturbance of the liquid crystal layer and reflected on a reflective film formed on the inside surface (the side in contact with the liquid crystals) of the back support plate of the display device.

As the transparent support plates, various kinds of transparent solid, such as various kinds of glass, molten quartz, transparent corundum, transparent synthetic and natural resins, etc. can be used. The transparent electrodes can be prepared by vapor-depositing, for example, indium oxide or tin oxide onto the support plates. The electrode to be formed on the reflective film may be, for example, a film of copper, aluminum, chromium or nickel.

In the present electro-optical display device, a means is operatively connected to said pulse generator for selectively supplying said pulse to the selected electrodes of first electrode means and second electrode means at a predetermined order for said selected electrode with a predetermined time interval in order to apply the pulsating electric field to the selected segments corresponding to said selected electrodes thereby to generate said dynamic scattering motion in the liquid crystal of the selected segments. The time interval is smaller than a period in which an intensity of light scattering to be observed decays to a predetermined value.

The alkyl iodide compounds can be used alone or in combination of two or more of these compounds in the present invention. Any of Schiff base type nematic liquid crystal compounds capable of exhibiting a dynamic scattering effect can be used in the present invention as the liquid crystal compound. These liquid crystal compounds can be also used alone or in combination of two or more of these compounds. It is an important condition for the application to the display devices that the temperature range of the nematic phase is approximately at room temperature.

The Schiff type nematic liquid crystal compounds used in the present invention include methoxybenzylidene-p-n-butylaniline (a nematic range: +21°C to +45°C), ethoxybenzylidene-p-n-butylaniline (a nematic range: +36°C to +78°C), ethoxybenzylidene-p-n-hexylaniline (a nematic range: +37°C to +76°C), etc. To obtain a liquid crystal composition having a liquid crystal temperature approximately at room temperature, two or more of the liquid crystal compounds can be used in mixture. For example, a 50 : 50 mixture (by weight) of methoxybenzylidene-p-n-butylaniline and ethoxybenzylideneaniline-p-n-butylaniline has a nematic range of −15°C to +50°C. Likewise, a 80 : 20 mixture of said compounds has a nematic range of +10°C to +47°C.

A three-component mixture, in which 5 parts by weight of ethoxybenzylidene-p-n-butylaniline is replaced with equal parts of methylbenzylidene butylaniline in said 50 : 50 mixture, has a nematic range of −10°C to +56°C. Furthermore, a 60 : 40 mixture (by weight) of methoxybenzylidene-p-n-butylaniline and ethoxybenzylidene-p-n-butylaniline has a nematic range of −10°C to +48°C, and a 50 : 50 mixture (by weight) of methoxybenzylidene-p-n-butylaniline and ethoxybenzylidene-p-n-hexylaniline has a nematic range of −80°C to +75°C.

Addition of at least 0.01 percent by weight of the alkyl iodide compound to the liquid crystal composition improves the electro-optical characteristics and reduces electric resistance of the composition remarkably. The upper limit to the amount of the alkyl iodide compound to be added is about 1.0 percent by weight. If more than 1.0 percent by weight of the alkyl iodide compound is added to the liquid crystal composition, the electro-optical characteristics of the liquid crystal materials is deteriorated, and thus the addition of the alkyl iodide compound in excess of the upper limit is not preferable. Addition of 0.05 to 0.8 percent by weight of the alkyl iodide compound to the liquid crystal composition can bring about an excellent effect without impairing the characteristics of the liquid crystal.

It seems that the distinguished advantage brought about by the addition of the alkyl iodide compound in the present invention is based on a fact that the resulting compound formed by the reaction of the nematic liquid crystal material and the alkyl iodide has a molecular structure similar to that of the Schiff base liquid crystal materials. That is to say, it can be presumed that the resulting ionic compound is well soluble in the liquid crystal composition, and thus shows a preferable reduction in the resistance of the liquid crystal composition. For example, methyl iodide reacts with the Schiff base liquid crystal to form an onium salt, as shown by the following equation (1), where R represents an aromatic group:

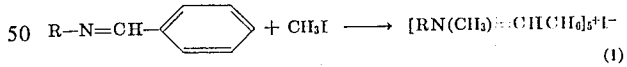

(1)

It seems that the resulting onium salt can lower the electric resistance without any deterioration of the characteristics of the liquid crystal.

Now, the present invention will be described in detail by way of examples.

EXAMPLES 1 – 4

A liquid crystal composition (DNM-1, a product made by Dai-Nippon Toryo K.K., Japan), which consists principally of a 1 : 1 mixture (by weight) of methoxybenzylidene-p-n-butylaniline (MBBA) and ethoxybenzylidene-p-n-butylaniline (EBBA) was mixed with methyl iodide in the amount as shown in Table 1, stirred and left standing at room temperature for 48 hours. Then, the resulting mixture was placed on a glass plate (3 mm thick and 40 × 50 mm² size) provided with a transparent tin oxide electro-conductive film thereon by spraying, and sandwiched with another nesa glass plate of the same size and thickness as the former, using a 6-μm thick polyester film as a spacer to form a kind of a transmission type display element. A bi-directional pulse voltage having a duty ratio of ⅛ and a pulse width of 2 m sec was applied to the display element by means of a pulse voltage generator, and the scattered light intensity and response time were determined according to the procedure shown in FIG. 2.

Figure 2:
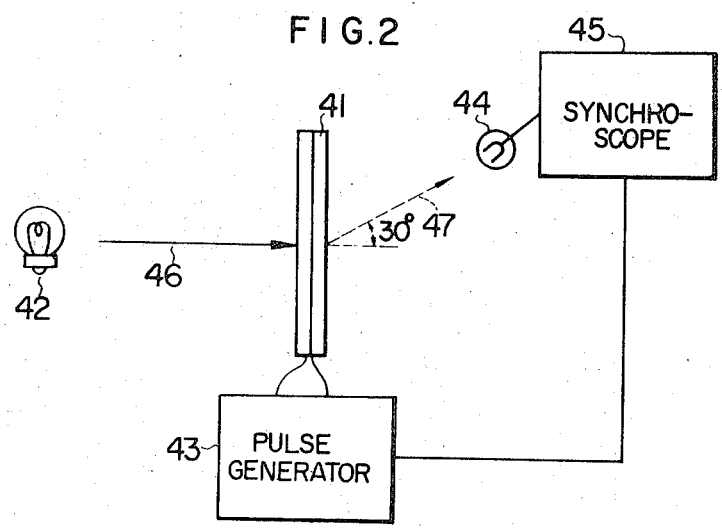
FIG. 2 is a schematic diagram showing a device for measuring scattered light intensity and a response time of an electro-optical device.

Referring to FIG. 2, white light beam 46 was injected from a tungsten lamp 42 into an electro-optical display device 41. Among the lights scattered by the electro-optical display device 41 a light ingredient 47 which was scattered by 30° from the axis of light beam 46 was received by a detector 44 and was measured by a synchroscope 45 connected to the detector 44. The measurement was conducted by applying different voltages to the electro-optical display device through pulsating voltage generator 43. The response time was a time from the application of the voltage until the light scattering amount reached 90 percent of a saturated value.

Figure 3:
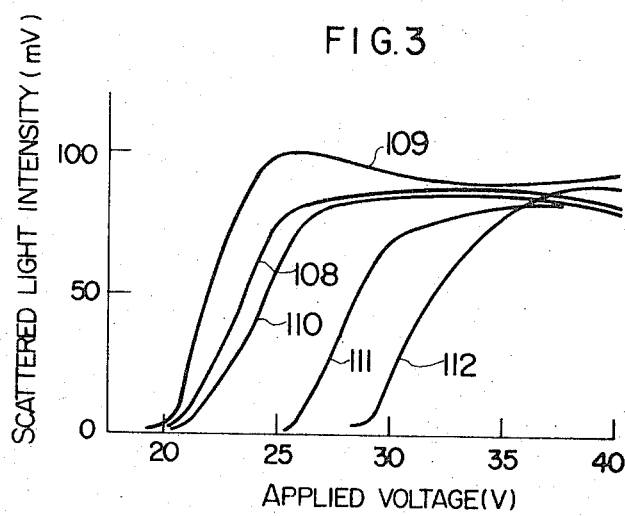
FIGS. 3 and 5 are graphs showing the relationship between the applied voltage and the scattered light intensity with respect to the liquid crystal compositions according to the present invention and comparative liquid crystals.
Figure 4:
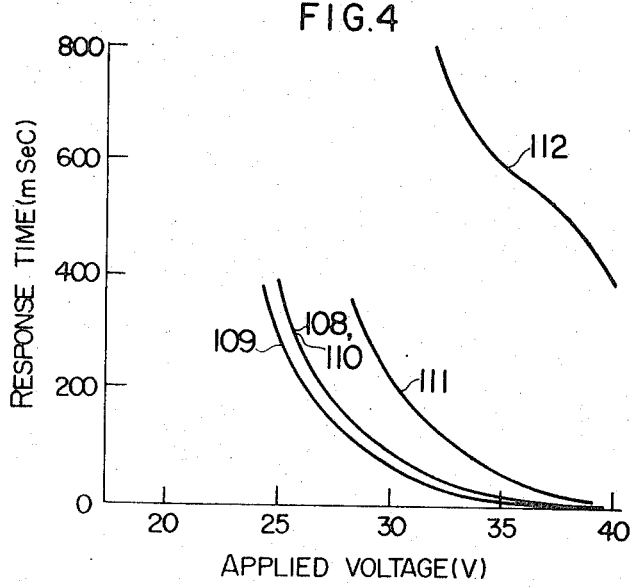
FIGS. 4 and 6 are graphs showing the relationship between the applied voltage and the response time with respect to the liquid crystal compositions according to the present invention and comparative liquid crystals.

The scattered light intensity and response time are plotted against applied voltage as shown in FIG. 3 and FIG. 4, respectively. The electric resistances of the elements under the application of voltage of 15 V DC are shown in Table 1.

As is seen from Table 1 and FIGS. 3 and 4, the addition of methyl iodide to the nematic liquid crystal composition (curves 108 - 111, corresponding to Examples 1 - 4, respectively) can attain lower threshold voltage, faster response time and lower electric resistance than the non-addition (curve 112).

Table 1

| Example | Amount of methyl iodide added (%) | Electric resistance ($\Omega \cdot cm$) |
|---|---|---|
| 1 | 0.06 | $1.28 \times 10^9$ |
| 2 | 0.11 | $1.24 \times 10^9$ |
| 3 | 0.21 | $1.13 \times 10^9$ |
| 4 | 0.81 | $0.28 \times 10^9$ |
| Non-addition | — | $60 \times 10^9$ |

EXAMPLES 5 - 7

Figure 5:
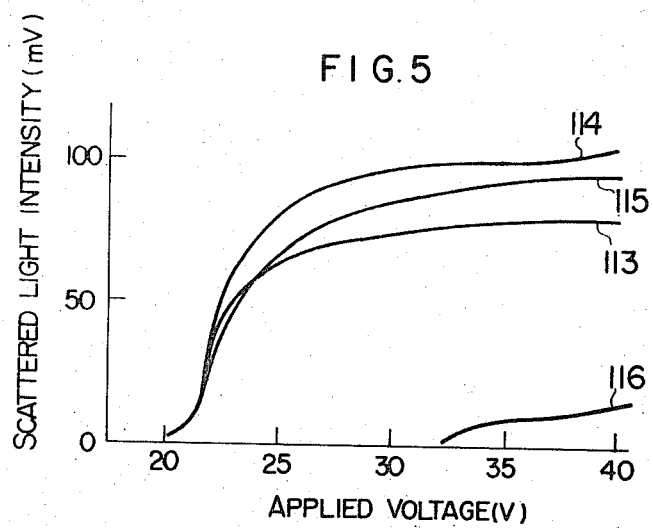
Figure 6:
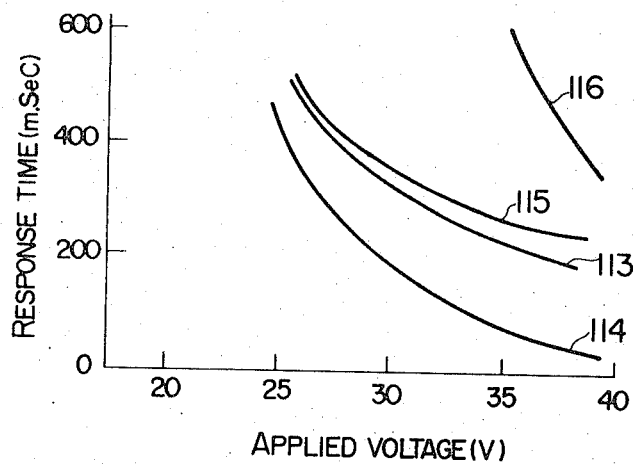

0.2 percent by weight of n-propyl iodide was added to each of the liquid crystal compositions of Table 2, and the resulting liquid crystal mixtures were thoroughly stirred, heated at 80°C for 24 hours, and then left standing at room temperature for 48 hours. Transmission-type display elements were prepared in the same manner as in Examples 1 - 4, using these liquid crystal compositions. A pulse voltage was applied to these display elements to determine light scattering characteristics. The scattered light intensity and response time are plotted against applied voltage, are shown in FIG. 5 and FIG. 6, respectively. Electric resistances of these elements under the application of voltage of 15 V DC are shown in Table 2, where parts are by weight.

Table 2

| Example | Liquid Composition | | Electric resistance ($\Omega \cdot cm$) |
|---|---|---|---|
| 5 | methoxybenzylidene-p-butylaniline | (80 parts) | $1.20 \times 10^9$ |
| | ethoxybenzylidene-p-butylaniline | (20 parts) | |
| 6 | methoxybenzylidene-p-n-butylaniline | (50 parts) | $1.18 \times 10^9$ |
| | ethoxybenzylidene-p-n-butylaniline | (45 parts) | |
| | methylbenzylidenebutylaniline | (5 parts) | |
| 7 | methoxybenzylidene-p-n-butylaniline | (60 parts) | $1.16 \times 10^9$ |
| | ethoxybenzylidene-p-n-butylaniline | (40 parts) | |
| Conventional Example* | methoxybenzylidene-p-butylaniline | (80 parts) | $1.10 \times 10^9$ |
| | ethoxybenzylidene-p-butylaniline | (20 parts) | |

*: No n-propyl iodide added.

As is seen from Table 2 and FIGS. 5 and 6, the addition of n-propyl iodide to the nematic liquid crystal compositions (curves 113 - 115, corresponding to Examples 5 - 7, respectively) can attain lower threshold voltage, faster response time and lower electric resistance than the non-addition (curve 116, corresponding to the conventional example).

EXAMPLE 8

0.1 percent by weight of n-propyl iodide was added to a liquid crystal composition consisting of 60 parts by weight of methoxybenzylidene-p-butylaniline and 40 parts by weight of ethoxybenzylidene-p-butylaniline, and the resulting mixture was heated at 60°C for about 5 hours, and then cooled to room temperature.

A transmission-type display element was prepared in the same manner as in Examples 1 - 4, using the resulting liquid crystal composition. The thus prepared element had an electric resistance of $1.3 \times 10^9$ $\Omega \cdot cm$ under the application of voltage of 15 V DC.

A bi-directional pulse voltage having a duty ratio of ⅛ and pulse width of 2 m sec was applied to the element in an arrangement as shown in FIG. 2, and the threshold voltage, contrast ratio under the application of voltage of 30 V, and response time under the application of voltage of 40 V were measured. The results are shown in Table 3.

As is shown from Table 3, the present element has lower threshold voltage, higher contrast and shorter rise time than the element containing no n-propyl iodide (non-addition).

Table 3

|  | Threshhold voltage | Contrast | Response time |
| --- | --- | --- | --- |
| Example 8 | 22 V | 38 | 30 ms |
| Non-addition | 38 V | 5 | 240 ms |

EXAMPLE 9

0.1 percent by weight of n-propyl iodide was added to a mixture consisting of 50 parts by weight of ethoxybenzylidene-p-n-butylaniline and 50 parts by weight of ethoxybenzylidene-p-hexylaniline, and the resulting mixture was heated at 60°C for about 5 hours, and then cooled to room temperature. A transmission-type display element was prepared in the same manner as in Examples 1 – 4, using the resulting liquid crystal composition. The element had an electric resistance of 1.22 × $10^9$ Ω·cm under the application of voltage of 15 V DC. A bi-directional pulse voltage having a pulse width of 2 m sec and duty ratio of ⅛ was applied to the liquid crystal element, and the threshhold voltage and response time under the application of voltage of 40 V were determined in the manner as shown in FIG. 1. The results are shown in Table 4.

Table 4

|  | Threshhold voltage | Response time |
| --- | --- | --- |
| Example 9 | 24 V | 20 ms |
| Non-additive of n-propyl iodide | 36 V | 500 ms |

As is apparent from Table 4, the present liquid crystal element has lower threshold voltage and shorter response time than the non-addition of n-propyl iodide.

The liquid crystal compositions according to the present invention can be applied not only to a light switch element or optical modulation element, as with the conventional nematic liquid crystal element, but also to multiplexed driving, which has been regarded as impossible in the case of the electro-optical element using the conventional liquid crystal material or to various driving circuits by selecting a proper electric resistance at the same time because of the lowering of the electric resistance. Particularly, the multiplexed driving can be carried out in a simple manner and in a cheap circuit in the present invention.

What is claimed is:

1. In an electro-optical device comprising a layer of a nematic liquid crystal of Schiff base type capable of exhibiting dynamic scattering effect; means for supporting said liquid crystal layer; a plurality of first electrode means for applying a pulse electric field to said liquid crystal layer, said liquid crystal layer being divided thereby into a plurality of segments; second electrode means for applying a pulse electric field to said liquid crystal layer, the second electrode means being positioned opposite to the first electrode means, the liquid crystal layer being sandwiched between the first electrode means and the second electrode means; means for applying a pulse electric field through the first and second electrode means to the segments of the liquid layer by multiplexing, an improvement comprising the liquid crystal containing 0.01 to 1.0 percent by weight of an alkyl iodide compound having an alkyl group of 1 to 4 carbon atoms, based on the nematic liquid crystal.

2. An electro-optical device according to claim 1, wherein an amount of the alkyl iodide compound added is of from 0.05 to 0.8 percent by weight.

3. An electro-optical display device comprising:
a pair of supporting members, at least one of them being transparent, whereby a dynamic scattering mode of a liquid crystal of Schiff base type is observed through said supporting members;
a layer of said nematic liquid crystal containing 0.01 to 1 percent by weight of an alkyl iodide compound having an alkyl group of 1 to 4 carbon atoms, based on the amount of the liquid crystal, said layer being interposed between said supporting member;
first electrode means for applying a pulsating electric field for generating said dynamic scattering motion to said layer, wherein a plurality of displaying segments are formed by said first electrode means in said layer;
second electrode means for applying said pulsating electric field in cooperation with said first electrode means, said first and second electrode means being formed on the inner surfaces of said respective supporting members;
a pulse generator for producing a pulse having an amplitude larger than a dynamic scattering motion limit but smaller than a discharge voltage of said liquid crystal and a pulse width smaller than 10 ms;
means operatively connected to said pulse generator for selectively supplying said pulse to the selected electrodes of said first electrode means and said second electrode means at a predetermined order for the said selected electrodes with a predetermined time interval in order to apply said pulsating electric field to the selected segments corresponding to said selected electrodes thereby to generate said dynamic scattering motion in said liquid crystal of said selected segments, said time interval being smaller than a period in which an intensity of light scattering to be observed decays to a predetermined value.

4. An electro-optical display device according to claim 3, wherein an amount of the alkyl iodide is of from 0.05 to 0.8 percent by weight based on the amount of the liquid crystal.

* * * * *